(12) United States Patent
Johansen

(10) Patent No.: US 10,659,894 B2
(45) Date of Patent: *May 19, 2020

(54) PERSONAL COMMUNICATION DEVICE HAVING APPLICATION SOFTWARE FOR CONTROLLING THE OPERATION OF AT LEAST ONE HEARING AID

(71) Applicant: Widex A/S, Lynge (DK)

(72) Inventor: Morten Kjaer Johansen, Lynge (DK)

(73) Assignee: Widex A/S, Lynge (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,043

(22) Filed: Aug. 29, 2019

(65) Prior Publication Data

US 2019/0387331 A1 Dec. 19, 2019

Related U.S. Application Data

(63) Continuation of application No. 15/324,942, filed as application No. PCT/EP2014/064784 on Jul. 10, 2014.

(51) Int. Cl.
*H04R 25/00* (2006.01)
*G06F 3/16* (2006.01)
*H04W 76/14* (2018.01)
*H04W 4/80* (2018.01)

(52) U.S. Cl.
CPC ........... *H04R 25/554* (2013.01); *G06F 3/165* (2013.01); *H04R 25/558* (2013.01); *H04W 4/80* (2018.02); *H04W 76/14* (2018.02)

(58) Field of Classification Search
CPC .... H04R 25/55; H04R 25/554; H04R 25/556; H04R 25/558; H04R 2225/55
See application file for complete search history.

(56) References Cited

U.S. PATENT DOCUMENTS

| | | | |
|---|---|---|---|
| 9,729,958 B2* | 8/2017 | Jaques | H04R 1/1041 |
| 2006/0039577 A1* | 2/2006 | Sanguino | H04R 25/554 |
| | | | 381/315 |
| 2007/0004463 A1* | 1/2007 | Clark | G06F 3/16 |
| | | | 455/569.1 |
| 2007/0071264 A1* | 3/2007 | Baechler | H04R 25/30 |
| | | | 381/315 |
| 2007/0255435 A1* | 11/2007 | Cohen | H04R 1/1016 |
| | | | 700/94 |
| 2008/0267435 A1* | 10/2008 | Schumaier | H04R 25/70 |
| | | | 381/314 |

(Continued)

FOREIGN PATENT DOCUMENTS

| | | |
|---|---|---|
| CN | 1988733 A | 6/2007 |
| CN | 103593635 A | 2/2014 |
| WO | 2014094859 A1 | 6/2014 |

*Primary Examiner* — Matthew A Eason
(74) *Attorney, Agent, or Firm* — Sughrue Mion, PLLC

(57) ABSTRACT

A hearing system includes at least one hearing aid (10) and a personal communication device (17) both having a short range radio transceiver for providing a short range radio communication link. The personal communication device includes application software for controlling the operation of said at least one hearing aid. The at least one hearing aid has a user operable control for opening the user interface of the application software on said personal communication device.

10 Claims, 4 Drawing Sheets

(56) References Cited

U.S. PATENT DOCUMENTS

| | | | |
|---|---|---|---|
| 2010/0142740 A1* | 6/2010 | Roerup | H04R 25/556 381/330 |
| 2011/0176697 A1* | 7/2011 | Apfel | H04R 25/305 381/314 |
| 2012/0183163 A1* | 7/2012 | Apfel | H04R 25/70 381/314 |
| 2015/0004954 A1* | 1/2015 | Sabin | H04M 1/72591 455/418 |
| 2015/0092971 A1* | 4/2015 | Kim | H04R 25/558 381/328 |
| 2016/0309267 A1* | 10/2016 | Fitz | H04R 25/558 |
| 2018/0109889 A1* | 4/2018 | Kang | G06F 3/162 |

* cited by examiner

PERSONAL COMMUNICATION DEVICE HAVING APPLICATION SOFTWARE FOR CONTROLLING THE OPERATION OF AT LEAST ONE HEARING AID

CROSS REFERENCE TO RELATED APPLICATIONS

This application is a continuation of U.S. application Ser. No. 15/324,942 filed Jan. 9, 2017, which is a National Stage of International Application No. PCT/EP2014/064784 filed Jul. 10, 2014, the contents of all of which are incorporated herein by reference.

BACKGROUND OF THE INVENTION

The present invention relates to a hearing system including at least one hearing aid and a personal communication device with application software for controlling the operation of said at least one hearing aid. Also, the invention relates to a method for controlling the operation of at least one hearing aid via a personal communication device. Furthermore the invention relates to a hearing aid implementing the method according to the invention, and a personal communication implementing the method according to the invention. Finally invention relates to a computer-readable storage medium having computer-executable instructions.

SUMMARY OF THE INVENTION

The purpose of the invention is to provide a hearing system for improving the usability of the application software for controlling the operation of said at least one hearing aid.

This purpose is according to the invention achieved by a hearing system that includes at least one hearing aid and a personal communication device—both having a short range radio transceiver for providing a short range radio communication link. The personal communication device has application software for controlling the operation of said at least one hearing aid. The at least one hearing aid has a user operable control for opening the application software on the personal communication device. Preferably, the short range radio communication link is a Bluetooth™ connection.

According to a further aspect of the invention, there is provided a hearing system including a personal communication device with a body-worn transmission accessory for connecting the personal communication device to at least one hearing aid via a short range radio communication link. The personal communication device includes application software for controlling the operation of said at least one hearing aid. The body-worn transmission accessory has a user operable control for opening the application software on said personal communication device. Preferably, the short range radio communication link is an inductive communication link based upon a proprietary communication protocol.

According to a further aspect of the invention, there is provided a hearing aid for connecting to a personal communication device via a short range radio communication link, the personal communication device including application software for providing a user interface for controlling the operation of the hearing aid. The hearing aid has a user operable control for opening the user interface of the application software on said personal communication device.

According to a yet further aspect of the invention, there is provided a method for controlling at least one hearing aid being connected to a personal communication device via a short range radio communication link. The personal communication device includes application software for controlling the operation of said at least one hearing aid. The method comprises opening the application software on said personal communication device by operating a user operable control on said at least one hearing aid.

According to a yet further aspect of the invention, there is provided a method for controlling at least one hearing aid being connected to a personal communication device with a body-worn transmission accessory via a short range radio communication link. The personal communication device includes application software for controlling the operation of said at least one hearing aid. The method comprises opening the application software on said personal communication device by operating a user operable control on said body-worn transmission accessory.

According to a still further aspect of the invention, there is provided a computer-readable storage medium having computer-executable instructions. When the computer-executable instructions are executed in a personal communication device, the personal communication device connects the personal communication device with at least one hearing aid via a short range radio communication link, provides a user interface for controlling the operation of the at least one hearing aid, and launches the user interface of the application software on said personal communication device in response to the operation of a user operable control on the hearing aid.

According to another aspect of the invention, there is provided a personal communication device adapted to connect the personal communication device with at least one hearing aid via a short range radio communication link, wherein the personal communication device includes application software providing a user interface for controlling the operation of said at least one hearing aid. The personal communication device is adapted to launch the user interface of the application software on said personal communication device in response to reception of an activation signal caused by operation of a user operable control on the hearing aid.

Finally there is according to a further aspect of the invention provided a personal communication device adapted to connect the personal communication device via a body-worn transmission accessory with at least one hearing aid via a short range radio communication link. The personal communication device includes application software providing a user interface for controlling the operation of said at least one hearing aid. The personal communication device is adapted to launch the user interface of the application software on said personal communication device in response to reception of an activation signal caused by operation of a user operable control on the body-worn transmission accessory.

BRIEF DESCRIPTION OF THE DRAWINGS

The invention will be described in further detail with reference to preferred aspects and the accompanying drawing, in which.

DETAILED DESCRIPTION

Figure 1:
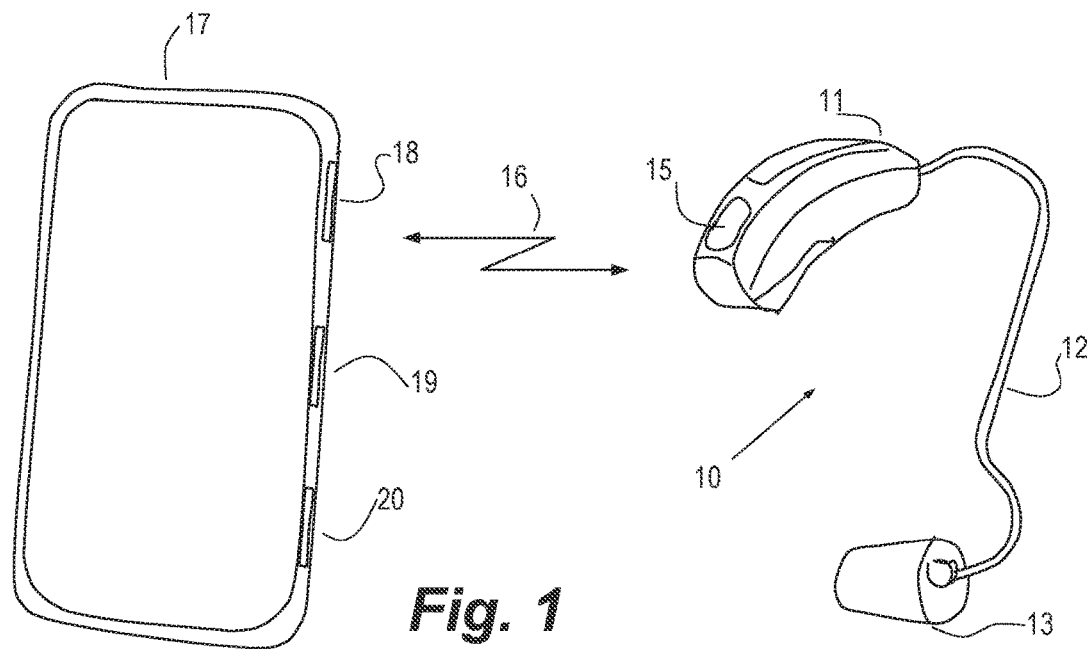
FIG. 1 schematically illustrates a hearing system according to a first embodiment of the invention.

Reference is made to FIG. 1, which schematically illustrates a hearing system according to an embodiment of the invention. Prior to use, the settings of the hearing aid are set and adjusted by a hearing care professional according to a prescription. The prescription is provided by an audiologist and is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit.

A first embodiment of a hearing system according to the invention includes at least one hearing aid 10 and a personal communication device 17. The shown at least one hearing aid 10 will often be constituted by a pair of hearing aids. The hearing aid 10 and the personal communication device 17—preferably a so-called smartphone—both include a short range radio transceiver for providing a short range radio communication link 16, which may be a Bluetooth™ Low Energy as many smartphones nowadays are Bluetooth™ LE, enabled and as Bluetooth™ LE chipsets for hearing aid are going to be standard components available on the market. The hearing aid 10 and the personal communication device 17 have to be paired for short range radio communication link 16 according to the Bluetooth™ specification.

The personal communication device 17 includes application software—preferably an app downloaded from an Internet server—for controlling the operation of the hearing aid 10. The hearing aid 10 includes in the illustrated embodiment a housing 11 containing the major part of the hearing aid electronics and intended to be worn behind the ear, an ear-plug 13 for being placed in the ear canal of the hearing aid user and containing the speaker of the hearing aid, and a wire connecting the speaker in the earplug and the hearing aid electronics in the housing 11. The housing 11 has a user operable control 15—preferably a depressable button—for switching between hearing aid programs. A hearing aid program in the hearing aid is intended to assist the user in gaining as much information as possible—often for improving the speech intelligibility—in specific listening situations. The user operable control 15 will in certain situations cause the hearing aid 10 to transmit a message to the personal communication device 17 for opening the application software controlling the hearing aid 10.

Even though the illustrated embodiment shows a Receiver-In-Canal (RIC) hearing aid, it will be evident for a person skilled in the art that the invention will be advantageous for any hearing aid architecture, including Completely-In-Canal (CIC) and Behind-The-Ear (BTE).

In the embodiment illustrated in FIG. 1, the personal communication device 17 has a touch sensitive display on the front and three control keys 18, 19, and 20 on the side for controlling the audio volume, locking and unlocking the device and activating a built-in camera, respectively.

Figure 2:
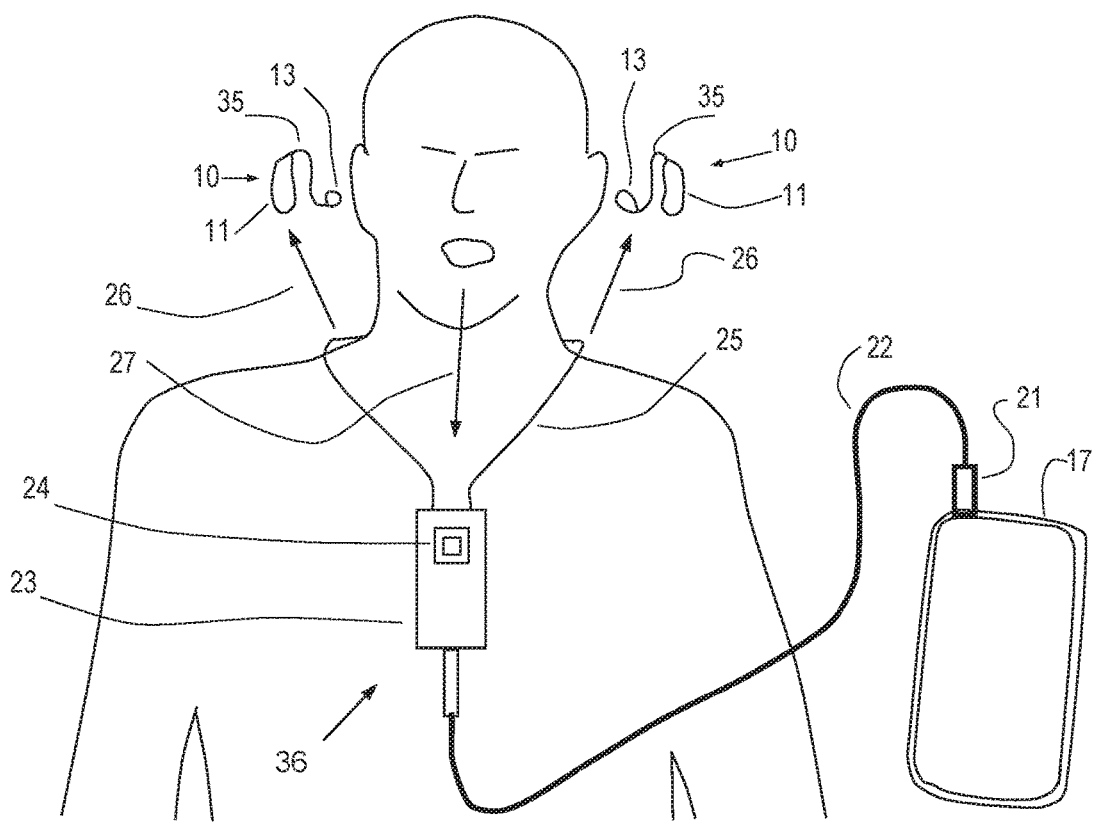
FIG. 2 schematically illustrates a hearing system according to a second embodiment of the invention.

Reference is made to FIG. 2, showing a second embodiment of a hearing system according to the invention. The hearing system according to the second embodiment includes at least one hearing aid 10 and a personal communication device 17. The shown at least one hearing aid 10 is in this embodiment a set of binaural hearing aids. The personal communication device 17—preferably a so-called smartphone—is provided with a body-worn transmission accessory 36 including a loop element 25 for connecting the personal communication device 17 to at least one hearing aid 10 via a short range radio communication link 26. The personal communication device 17 has application software for controlling the operation of said at least one hearing aid 10.

The hearing aid 10 according to the second embodiment includes a housing 11 containing the major part of the hearing aid electronics and intended to be worn behind the ear and containing the speaker of the hearing aid. A sound guide 35 allows the acoustic energy to propagate from the speaker inside the housing 11 to an outlet in an ear-plug 13 being placed in the ear canal of the hearing aid user.

The body-worn transmission accessory 36 includes a neck strap containing the conducting and radiating loop element 25 proximately to the set of hearing aids 10 during the intended use. The neck strap is anchored in a housing 23 containing the electronics driving the loop element 25. The body-worn transmission accessory 36 is connected via a cable 22 and a jack plug 21 to the personal communication device 17 having application software for controlling the operation of the at least one hearing aid 10. The jack plug 21 may preferably be a 3.5 mm 4-conductor TRRS (tip-ring-ring-sleeve) phone connector fitting to sockets having become particularly common on smartphones and tablet computers. Hereby the hearing aid user may use the body-worn transmission accessory 36 for talking hands-free on his mobile phone or streaming audio from his favorite device like table computer or music player. No pairing is required as the operating range between the loop element 25 and the hearing aids 10 normally will be below 30 cm. Once the cable is plugged into the audio source, and the audio source is turned on, streaming starts automatically.

The housing 23 of the body-worn transmission accessory 36 contains a not-shown built-in microphone for picking up the hearing aid user's speech 27 when using a mobile telephone or when using Skype™ via a computer or tablet computer. Furthermore, the housing 23 has a push button 24 by means of which the hearing aid user is able to answer an incoming call and terminate an ongoing call. The body-worn transmission accessory 36 excites via the radiating loop element 25 an inductive radiofrequency signal 26 picked up by a receiving coil in the hearing aid 10, whereby an audio signal is streamed from the smartphone or personal communication device 17 to the hearing aids 10.

The body-worn transmission accessory 36 connected to the personal communication device 17 has a user operable control—preferably the push button 24—which apart from the handling of ingoing and ongoing calls, upon operation thereof sends instructions via the cable 22 to personal communication device 17 for opening the application software controlling the hearing aids 10.

The short range radio communication link 26 is in this embodiment preferably an inductive coupling being able to transfer an electric representation of an audio signal from the body-worn transmission accessory 36 to the hearing aids 10 and control signals forward and backward. The short range radio communication link 26 can be based upon the same specification and protocol as the one used by the set of binaural hearing aids for intercommunication.

The personal communication device 17 may be of the same type as the smartphone discussed with reference to FIG. 1.

Figure 3:
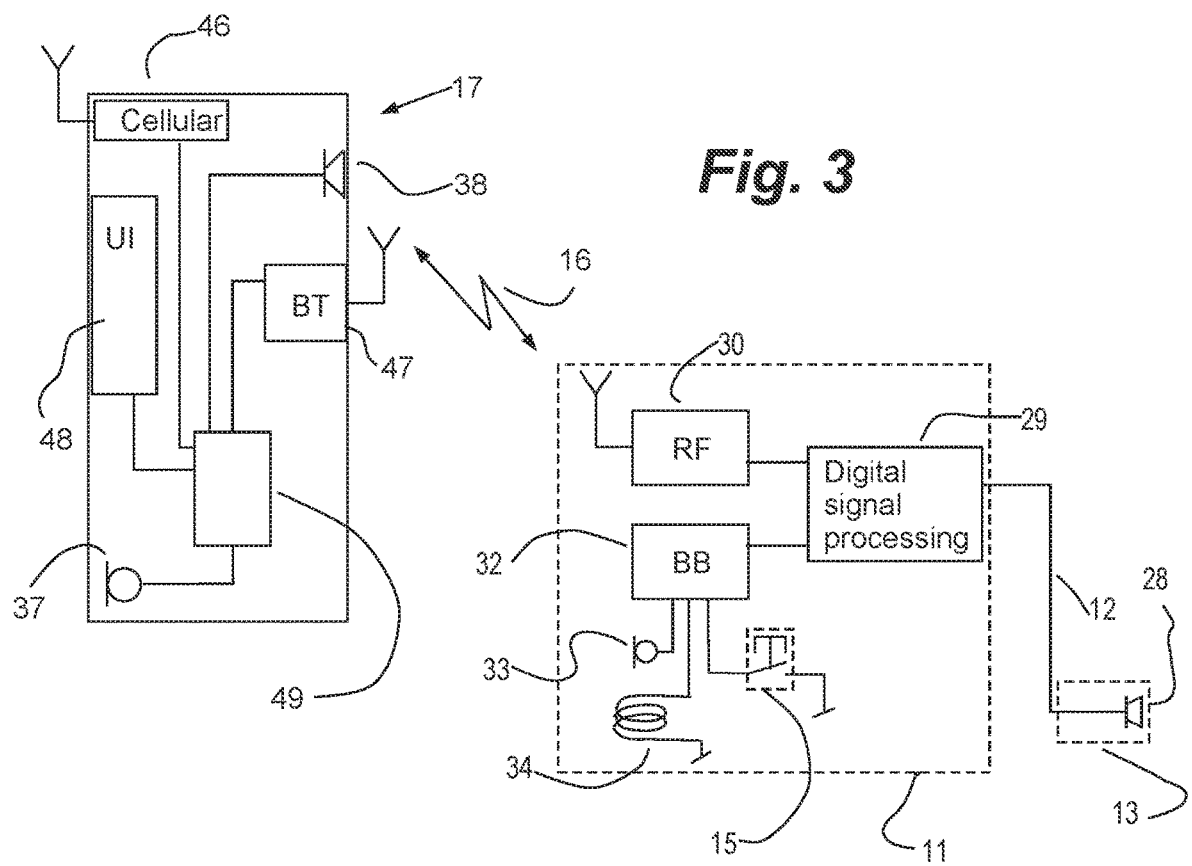
FIG. 3 illustrates in details the hearing aid system shown in FIG. 1.

By referring to FIG. 3, the hearing aid 10 (shown in FIG. 1) will be explained in details. Electric signals from a transducer 33 are digitized in a baseband block 32 and led to a digital signal processing (DSP) unit 29 for amplification and conditioning according to a predetermined setting set by an audiologist. The input signal is preferably split into a number of narrow frequency bands which can then be processed separately. The processing unit 29 delivers an amplified and conditioned electrical output signal which is led via a cable 12 to an output transducer or a speaker 28 contained in an earplug 13. Preferably Delta-Sigma-conversion is applied in the signal processing so the electrical output signal is formed as a one-bit digital data stream fed directly to the output transducer 28, whereby the hearing aid 10 drives the output transducer 28 as a class D amplifier.

The hearing aid 10 includes a tele-coil 34 for picking up a broadcasted electromagnetic signal, and the push button or user operable control 15. The tele-coil signal is handled by the baseband block 32 and the processing unit 29 in a similar way as the audio signal picked up by the microphone 33. When the user operates the push button or user operable control 15, the baseband block 32 detects the manipulation and the processing unit 29 analyses the current state of the hearing aid 10. When the hearing aid 10 is connected to the personal communication device 17, the processing unit 29 sends via a transceiver unit 30, a message to the personal communication device 17 to open the user interface of the application software controlling the hearing aids 10.

The personal communication device 17 may be a mobile phone having a microphone 37, a speaker 38, and a processor 49 controlling the operation. The personal communication device 17 is intended to provide the user a wide variety of communication services, and for this purpose the personal communication device 17 includes a wireless transceiver component 46 for cellular and WLAN communication. Furthermore, the personal communication device 17 includes a transceiver unit 47 preferably formed as a Bluetooth™ module. The two transceiver units 47 and 30 provide the short range radio communication link 16.

Figure 5:
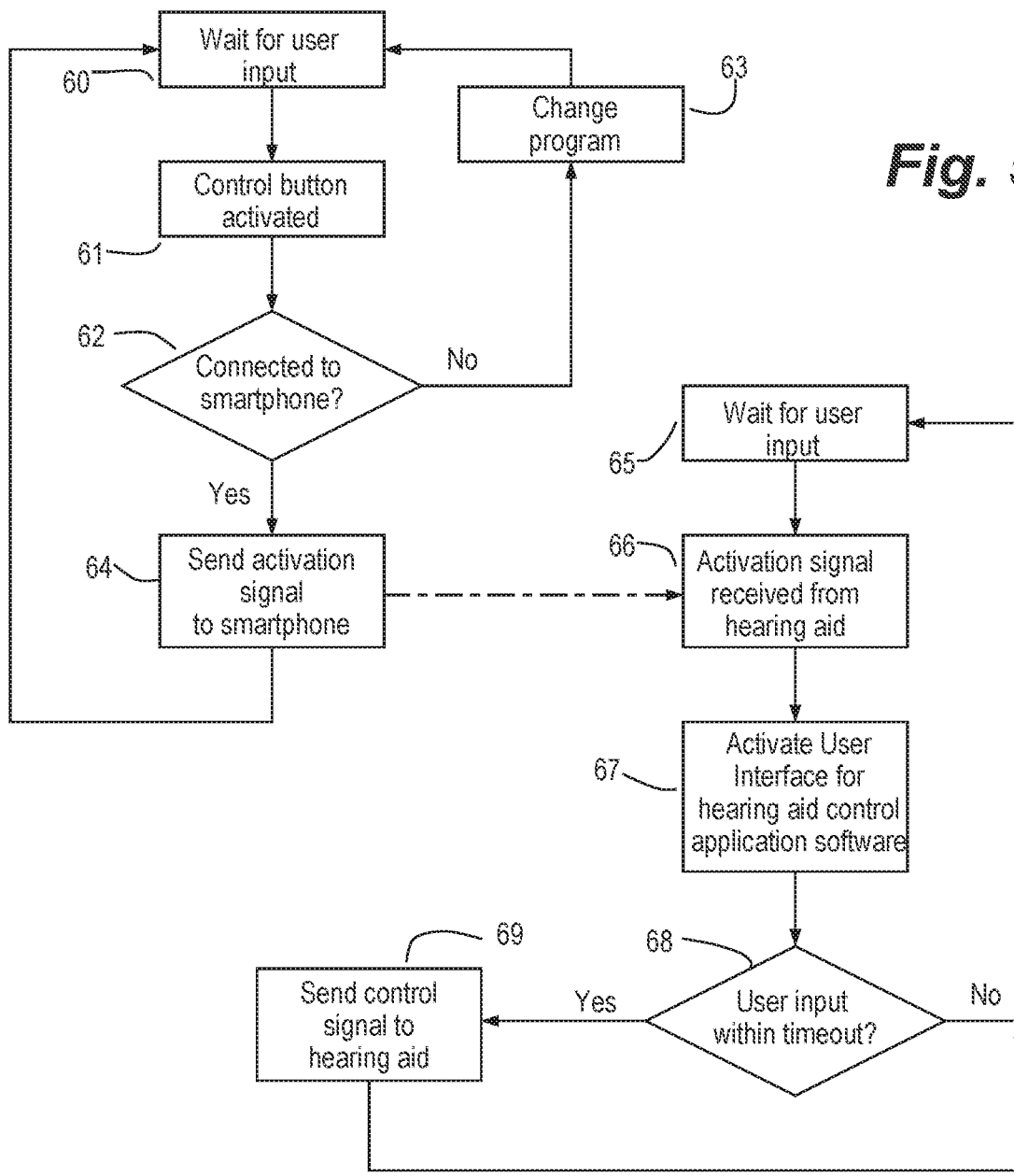
FIG. 5 illustrates a flow chart for a method according to the invention for the embodiment shown in FIG. 1.

In the embodiment shown in FIG. 1, the hearing aid 10 may assume two different states affecting the functionality of the user operable control 15. This is explained with reference to FIG. 5. In a first state the hearing aid 10 is in a so-called stand-alone state without connection to the personal communication device 17, and in a second state the hearing aid 10 and the personal communication device 17 will be in a so-called connected state. The processer 29 monitors the activity in step 60, and if the user operable control 15 is depressed at step 61, the processor 29 checks the current state of the hearing aid 10 at step 62. If the hearing aid 10 is in the stand-alone state, the processor 29 changes the hearing aid program at step 63 and provides the user with an audible indication of the present program, and the processor 29 continues to step 60 monitoring the activity. Multiple depressions of the user operable control 15 in the stand-alone state will move through all available programs in an endless loop (step 60-63).

If the hearing aid 10 is in the connected state, the processor 29 initiates the sending of an activation signal (marked with a broken line) to the personal communication device 17 in step 64. Hereafter the processor 29 starts waiting for further instructions in step 60.

The personal communication device 17 may be in locked state—either streaming audio from a continual audio source as a music player, television, radio or a pod-cast, to the hearing aid 10 or just be in idle. The personal communication device 17 may also be in two-way communication mode—like a telephone conversation.

Figure 4:
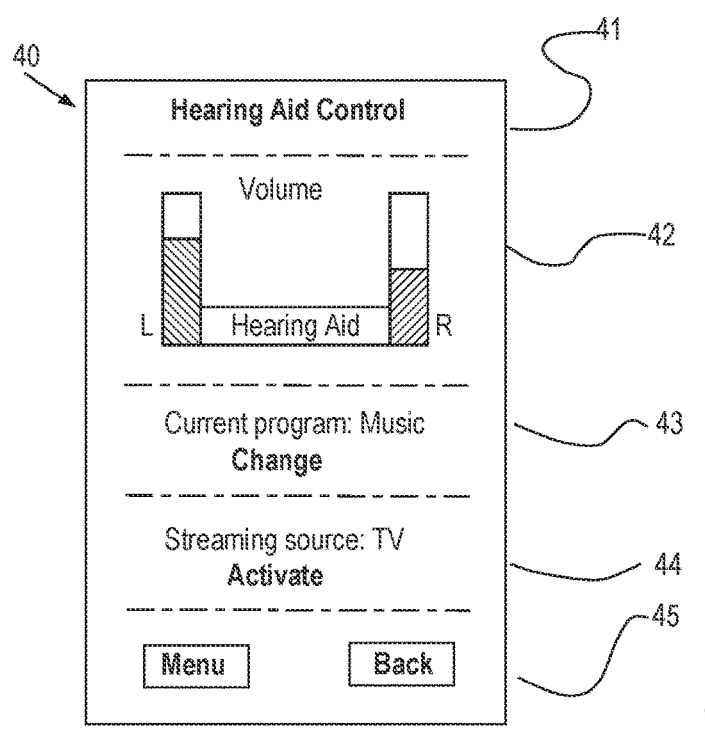
FIG. 4 illustrates one embodiment of the user interface of the control app according to the invention.

When the personal communication device 17 in step 66 receives an activation signal from the hearing aid, the processor 49 will leave its previous state waiting for input in step 65, check out the current state of the personal communication device 17 and in step 67 open a user interface 40 for the control application software for the hearing aids 10 as seen in FIG. 4. The user interface 40 for the control application software for the hearing aids 10 will remain active for a short predetermined period of time—e.g. 5-8 seconds—and if the processor 49 in step 68 find this short predetermined period of time passed without any user input, the processor 49 will reassume its previous state waiting for input in step 65. If the processor 49 in step 68 detects an input from the user, the processor starts sending a control signal to the hearing 10 according to the instructions input by the user—and the processor 49 will resume its previous state waiting for input in step 65.

For the embodiment of the hearing aid system shown in FIG. 2, the behavior will be slightly different as the functionality of the button will depend on the operation of the personal communication device 17. This will be explained with reference to FIG. 6. The processer 49 monitors in step 70 the activities of the personal communication device 17—including the operation of the user interface to which the body-worn transmission accessory 36 belongs. If the user operable control 24 is activated at step 71, the processor 49 checks in step 72 the whether an incoming call is in progress, and if this is the case, the activation of the user operable control 24 will start a completion of the call set-up in step 73 and the personal communication device 17 will enter a call-ongoing state, and the processor 49 will continue monitoring the activities of the personal communication device 17 in step 70.

When the personal communication device 17 is in the so-called call-ongoing state, an additional activation in step 74 of the user operable control 24 will cause the processor 49 to terminate the ongoing call in step 75, and the processor 49 will continue monitoring the activities of the personal communication device 17 in step 70.

When no call is in progress or is ongoing, the processor 49 deems in step 78 the activation of the user operable control 24 on the body-worn transmission accessory 36 to be a request to activate the user interface 40 for the control application software for the hearing aids 10 as seen in FIG. 4. This takes place in step 79. The user interface 40 for the control application software for the hearing aids 10 will remain active for a short predetermined period of time—e.g. 5-8 seconds—and if the processor 49 in step 80 finds this short predetermined period of time passed without any user input, the processor 49 will resume its previous state waiting for input in step 77. If the processor 49 in step 80 detects an input from the user, the processor starts sending a control signal via the body-worn transmission accessory 36 to the hearing 10 according to the instructions input by the user—and the processor 49 will resume its previous state waiting for input in step 77.

The activation of the personal communication device 17 from either the hearing aid 10 or the body-worn transmission accessory 36 is advantageous for the user as he may access the hearing aid control app by just providing a single key press—even though the personal communication device 17 is in locked state. The invention is advantageously in the way the access to the entire user interface of the control app and not only a short cut to one frequently used operation.

Figure 6:
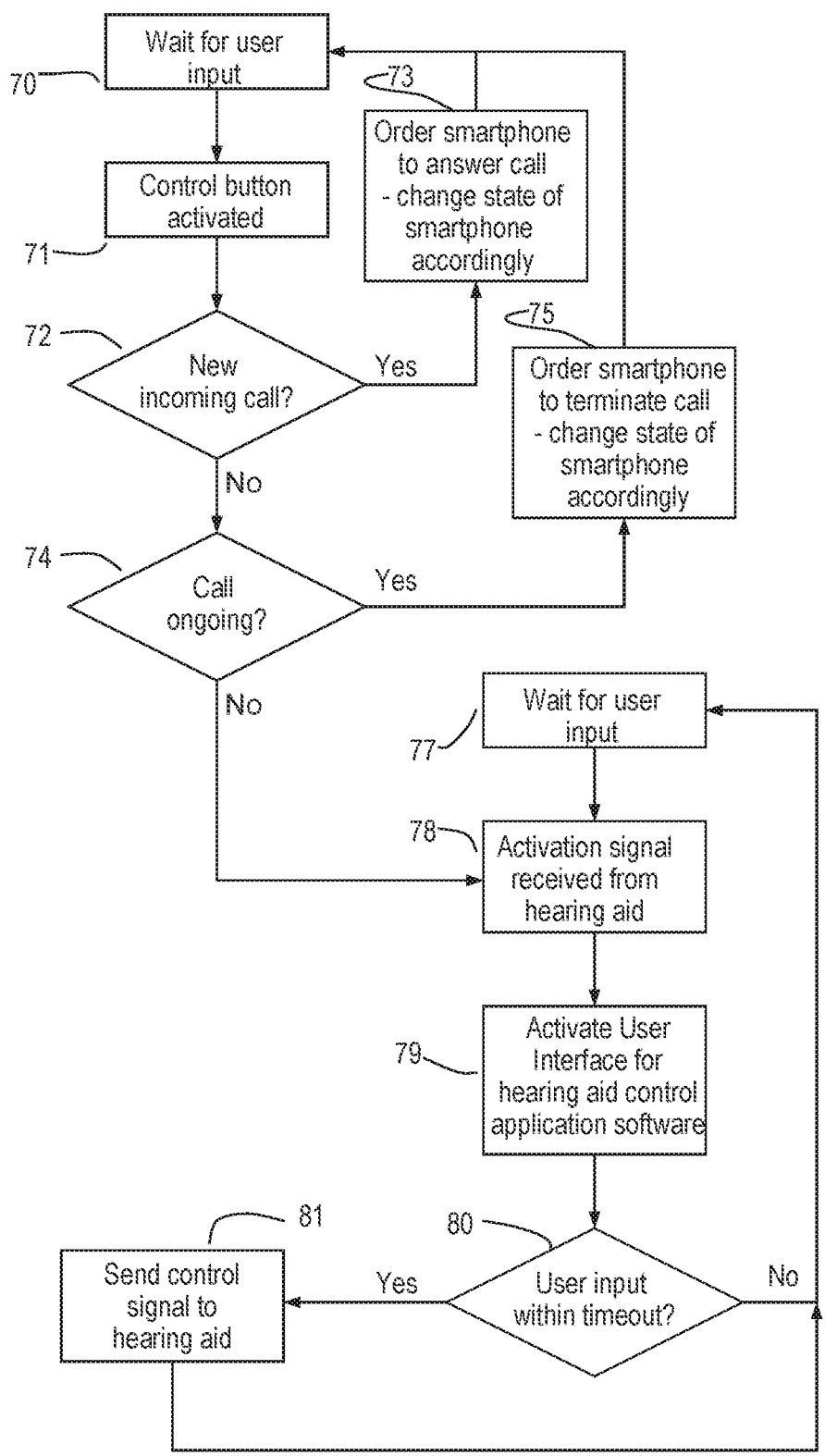
FIG. 6 illustrates a flow chart for a method according to the invention for the embodiment shown in FIG. 2.

An improvement of the embodiment discussed with reference to FIGS. 2 and 6 includes introduction of short and long press of the user operable control 24. This means that pressing a button for less than e.g. 0.8 second will classify the activation as a short press and pressing a button for longer than e.g. 0.8 second will classify the activation as a long press. Short pressing the user operable control 24 when an incoming call has been detected or is ongoing, the activation will cause the personal communication device 17 to establish or terminate the call, respectively. Long pressing the user operable control 24 may under these conditions then user interface 40 of the control app is shown in FIG. 4.

One embodiment of the user interface 40 of the control app is shown in FIG. 4. The user interface 40 of the control app occupies preferably the major part of the touch screen of the personal communication device 17. The user interface 40 is divided into various segments including a header area 41 identifying the app—here "Hearing Aid Control". The first control area is a volume control area 42 for the hearing aid 10. In the shown embodiment, we see a bar in which the current audio source "Hearing Aid" is shown, and this indicates that it is the microphone signal from the microphone 33 that is outputted via the speaker 28. Other audio sources may include telephone, television, radio and Internet. The adjustments are only applied to the individual audio sources. The adjustments are applied by sliding the finger in upwards or downwards direction along the two columns—Left and Right.

The second control area is a hearing aid program selection area 43. Here the user may assist the hearing aid to handle the background audio in case the hearing aid 10 has classified the background area wrongly. "Music" is identified as the current hearing aid program, and touching the hearing aid program selection area 43, will open a new screen on which the user may select a more appropriate hearing aid program.

The third control area is a streaming source selection area 44. As seen the latest used streaming source was "TV", and touching the streaming source selection area 44, will re-activate the streaming. Hereafter the streaming source selection area 44 will offer the user to de-activate the streaming source. A fourth control area 44 provides access to the entire range of settings by pressing "Menu", and the user may adjust set a new streaming source, define a new personalized hearing aid program, or request for remote support. The "Back" control will close the user interface 40 of the control app.

Once the user has entered an input to the user interface 40 of the control app, the processor 49 will close the user interface 40 of the control app if no further input is entered within a time-out having 5-8 seconds duration.

The user operable control 15 or 24 may be a depressable button based a mechanical switch, a rotary switch (hinged), a touch sensor—e.g. a capacitive switch just sensing the presence of the user's finger.

The opening of the application software on said personal communication device may include the launch of a graphical user interface (GUI) on the personal communication device 17, but the application software may also include a voice control function. Hereby the user may control the hearing aid by means of his voice once the voice control function has been opened.

The invention claimed is:

1. A hearing system including at least one hearing aid and a personal communication device each including a respective short-range radio transceiver for providing a short-range radio communication link,
    wherein the personal communication device includes application software adapted for providing a user interface for controlling the operation of the at least one hearing aid,
    wherein the at least one hearing aid has a processor and a user operable control,
    wherein the processor, upon activation of the user operable control, is adapted for the sending of an activation signal to the personal communication device; and
    wherein the personal communication device has a processor adapted for opening, upon reception of the activation signal from the at least one hearing aid, the user interface for controlling the operation of the at least one hearing aid.

2. The hearing system according to claim 1, wherein the short-range radio communication link is a Bluetooth™ connection.

3. The hearing system according to claim 1,
    wherein the user operable control of the hearing aid in a first mode provides access to change a hearing aid program or to adjust the volume of the hearing aid, and
    wherein the user operable control of the hearing aid in a second mode initiates the transmission of a signal via the short-range radio communication link to the personal communication device for opening the application software.

4. The hearing system according to claim 3, wherein the hearing aid enters the second mode upon connecting to the personal communication device via the short-range radio communication link.

5. The hearing aid according to claim 1, wherein the user operable control is a depressible button.

6. The hearing system according to claim 1, wherein the processor is adapted for automatically opening the user interface for controlling the operation of the at least one hearing aid even though the personal communication device is in locked mode.

7. A method for controlling at least one hearing aid connected to a personal communication device via a short-range radio communication link, and the method comprising:
    providing a user interface for controlling the operation of the at least one hearing aid on the personal communication device including application software,
    sending an activation signal from the at least one hearing aid to the personal communication device upon activation of a user operable control on the hearing aid; and
    triggered by the reception of the activation signal from the at least one hearing aid via the short-range radio communication link, automatically opening the user interface for controlling the operation of the at least one hearing aid.

8. The method according to claim 7, wherein the step of automatically opening the user interface takes place even though the personal communication device is in locked mode.

9. A non-transitory computer-readable storage medium carrying thereon a computer program comprising instructions which, when the program is executed by a processor in a personal communication device:
    connects the personal communication device to at least one hearing aid via a short-range radio communication link;

provides a user interface for controlling the operation of the at least one hearing aid; and triggered by receiving an activation signal from the at least one hearing aid via the short-range radio communication link, automatically opening the user interface for controlling the operation of the at least one hearing aid.

10. The non-transitory medium according to claim 9, wherein the step of automatically opening the user interface takes place even though the personal communication device is in locked mode.

\* \* \* \* \*